United States Patent [19]
Wojan et al.

[11] Patent Number: 5,286,117
[45] Date of Patent: Feb. 15, 1994

[54] BEARING WITH ASYMMETRICAL FLEXIBLE SECTION

[75] Inventors: Scott A. Wojan, Ypsilanti; Robert W. Frayer, Jr., Gregory, both of Mich.

[73] Assignee: NTN Corporation, Osaka, Japan

[21] Appl. No.: 931,195

[22] Filed: Aug. 17, 1992

[51] Int. Cl.⁵ ............................................. F16C 33/58
[52] U.S. Cl. .................... 384/513; 384/569; 384/571
[58] Field of Search ............... 384/513, 535, 564, 569, 384/571, 581

[56] References Cited

U.S. PATENT DOCUMENTS

| | | | |
|---|---|---|---|
| 3,513,480 | 5/1970 | Robinson | 384/535 |
| 4,898,481 | 2/1990 | Hamblin | 384/581 |
| 4,909,641 | 3/1990 | McKenzie | 384/513 X |

FOREIGN PATENT DOCUMENTS

| | | | |
|---|---|---|---|
| 2654203 | 6/1978 | Fed. Rep. of Germany | 384/569 |
| 811006 | 3/1981 | U.S.S.R. | 384/571 |

OTHER PUBLICATIONS

T. A. Harris *Optimizing the Fatigue Life of Flexibly-Mounted Rolling Bearings* dated: Oct. 1965 vol. 21, No. 10 pp. 407–429.

T. A. Harris and J. L. Broschard *Analysis of an Improved Planetary Gear-Transmission Bearing* dated: Sep. 1964 pp. 457–462.

A. B. Jones and T. A. Harris *Analysis of a Rolling-Element Idler Gear Bearing Having A Deformable Outer--Race Structure* dated Jun. 1963 pp. 273–277.

Primary Examiner—Thomas R. Hannon
Attorney, Agent, or Firm—Harness, Dickey & Pierce

[57] ABSTRACT

Rolling element bearings and particularly design features which reduce peak stresses acting on the bearing elements which affect bearing service life and rated load caring capacity. To reduce maximum stresses imposed by applied loads acting on the bearings, one or more of the bearing elements features an asymmetric configuration in which circumferential segments of the bearing element have increased flexibility. Such flexibility reduces maximum loads on the bearing and spreads out the load over a larger circumferential region. In addition to applied load components, nonuniform loads can act on rolling bearing elements at their lines of contact with the bearing raceways. In some embodiments of this invention segments of the bearing feature greater flexibility in order to adjust the load distribution acting on the rolling elements lines of contact.

46 Claims, 6 Drawing Sheets

Fig-20

BEARING WITH ASYMMETRICAL FLEXIBLE SECTION

BACKGROUND AND SUMMARY OF THE INVENTION

This invention relates to rolling element bearings and particularly to such bearings having design features for providing a more favorable sharing of loading on the bearing elements thus providing increased service life and/or load carrying capacities.

Rolling element bearings such as ball, tapered, needle, and cylindrical bearings are used in widespread applications. When rolling element bearings are used to support pure radial loads, or a combination of radial and thrust loads (as opposed to pure axial or thrust loads) they have an inner race surrounded by an outer race with rolling elements interposed between them. The operating life of rolling element bearings is related to the maximum stresses experienced by the bearing components. Cyclical application of such stresses produce fatigue damage to the bearing, leading to ultimate bearing failure. By providing a more even sharing of rolling element loading around the circumference of the races and forcing a more favorable distribution of stress at each rolling element raceway contact, bearing life and load carrying capacity can be increased. This invention is related to design features for providing such loading conditions.

In their operating environments, bearings may be exposed to applied loads which create contact stresses which are not uniform around the circumference of one of the races and act repeatedly on the same area. Consequently, the contact stress developed between the rolling elements and the bearing races vary as a function of the angular position on one or both of the races. Various design approaches are available for reducing peak contact stresses, such as enlarging the overall bearing size so that larger and more numerous rolling elements combine to restrain the applied loads. Such design approaches, however, possess tradeoffs and disadvantages of their own.

One facet of this invention involves design approaches which enable bearings to be designed in a way that peak contact stresses are reduced by causing the loading around the circumference of a bearing race to be spread out over a larger angular range. By reducing peak contact stresses, the life of the bearing can be extended, or in the alternative, the bearing can be rated to have a higher maximum external load carrying capability.

Conventional rolling element bearings have inner and outer races which are rotationally symmetrical. In other words, a radial cross-section taken at any circumferential position has the same cross-sectional shape and area. In accordance with this invention, the bearing inner and/or outer race is provided with circumferential segments which are more flexible in response to rolling element contact loads as compared with other segments. Such "structural asymmetry" can be provided by modification to the bearing mounting structure or to the bearing races themselves. In a preferred embodiment of this invention, one or both of the races have a variation in cross-sectional shape which renders certain circumferential segments less stiff than other segments. By placing the more flexible circumferential segments in the region where peak applied loads are expected, a reduction in peak contact stress occurs. This reduction provides a bearing having a longer service life characteristic and also enables the bearing to be used with higher applied loads. Various embodiments of this invention describe techniques for providing asymmetrical flexibility characteristics for the bearing.

In addition to the circumferential distribution of applied load, rolling element bearings may be subjected to misalignment between the inner and outer bearing races. Such misalignment as well as other factors can cause the force distribution along the lines of contact between the rolling elements and the races to be nonuniform. Significantly higher forces and resulting stresses can be encountered at one axial end of the rolling elements as compared to the other. In addition to conditions where one axial end of a rolling element is disproportionately loaded, transient loading conditions along the bearing element lines of contact can occur. In such conditions, the peak stress alternates between ends of the bearing elements, or one rolling element repeatedly has a higher average normal load than another element. As in the case of applied load induced stresses, a reduction in peak stress and elimination of transients along the rolling element lines of contact also tend to increase the bearing service life.

In view of the foregoing, this invention further involves techniques for producing greater uniformity in stress distribution along the bearing element contact lines by selectively providing portions of the axial length of one of the bearing races with increased flexibility. Such increased flexibility can be provided either by modification to the bearing housing or the races themselves. Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
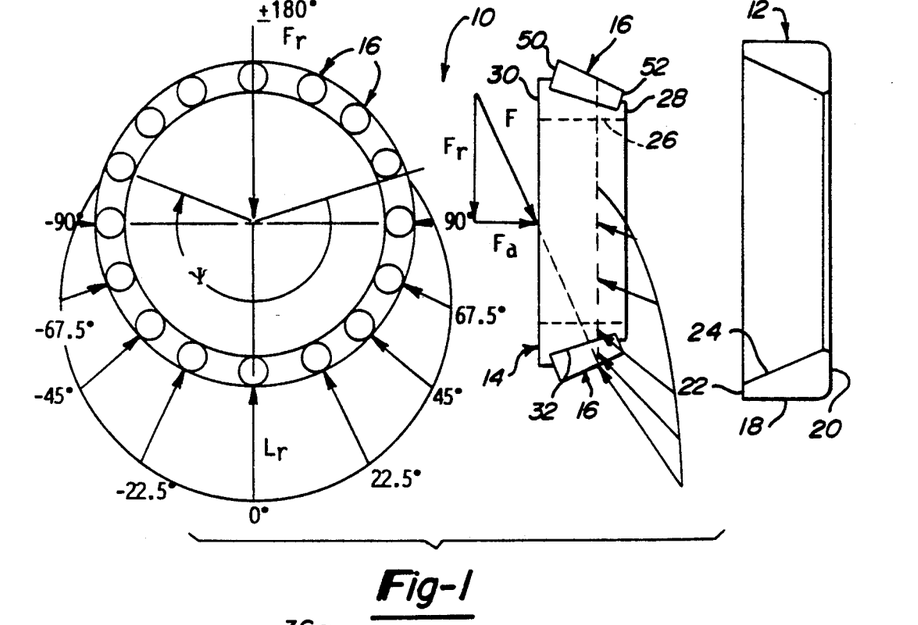
FIG. 1 is a pictorial view of a tapered roller bearing showing an applied force having a significant radial component and showing reaction forces acting on the rolling bearing elements and their circumferential distribution.

To aid in an explanation of the novel features of this invention, some general principles of bearing design and loading will be discussed with reference to FIGS. 1 and 2. FIG. 1 shows a representative tapered rolling bearing assembly identified by reference number 10. Tapered roller bearing 10 includes a bearing outer race or cup 12, a bearing inner race or cone 14, and a number of tapered rolling bearing elements 16. Bearing cup 12 has a cylindrical outside diameter 18, radial back face 20 and front face 22, and a conical surface defining race 24. Bearing cone 14 has an inside diameter 26, radial back face 28 and front face 30, and a conical surface defining race 32.

The representative roller bearing 10 shown in FIG. 1 is subjected to an external load which acts on the bearing races normal to their surface designated by the average force vector labeled "F", which in this example, maintains a stationary orientation with respect to bearing cup 12. Applied force F is resolved into a radial component designated as $F_r$, and an axial or thrust component designated as $F_a$ (further reference to the axial and radial directions of the bearing are consistent with the direction of vector components $F_a$ and $F_r$, respectively). The applied force F produces reaction forces distributed about the bearing assembly through the contact between individual bearing elements 16 at their lines of contact with cup 12 and cone 14. The resulting forces acting on each of the bearing elements 16 is shown in FIG. 1 and are designated by force vectors $L_r$. Although the roller loads $L_r$ are distributed along the lines of contact of each tapered element 16, they are represented as a single average force vector in this Figure for simplicity. The angular extent of the "load zone" circumferentially around bearing cup 12 is designated by the angle $\psi$ and is related to the ratio between the radial and axial components of the applied load F ($F_r/F_a$). As this ratio increases, the angular extent $\Psi$ of the load zone decreases and visa versa. As shown in FIG. 1 it is possible for a tapered roller bearing 10 to be heavily loaded over a relatively low percentage of the bearing circumference as a result of a high radial-to-thrust load ratio. In the case of the illustration of FIG. 1, roller loads $L_r$ extend approximately 200° around the circumference of cup 12, although the more heavily loaded areas are confined to approximately one-third of the circumference or about 120°.

Figure 2:
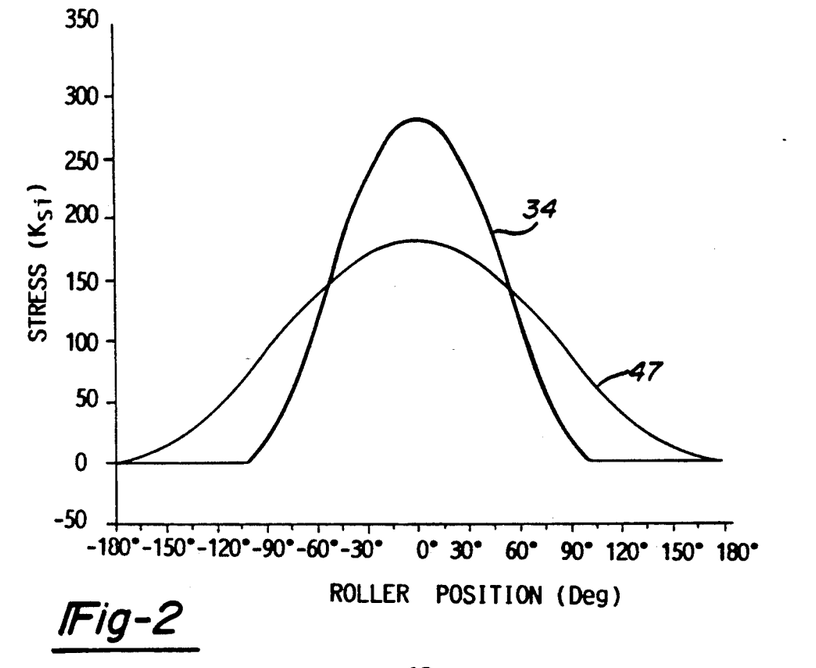
FIG. 2 is a graph showing compressive stress versus roller position around the circumference of a bearing, both for a prior art bearing and one in accordance with this invention.

FIG. 2 presents a curve 34 which relates the compressive stress resulting from the various roller contact loads $L_r$ plotted on the Y axis at various roller positions in degrees plotted on the X axis. As shown, the stress distribution is sharply peaked and confined to a relatively narrow circumferential angular range.

The generalized loading condition shown in FIGS. 1 and 2 is not atypical. There are many applications in which a high applied loading is placed on a roller element bearing which has a fixed orientation with respect to the bearing cup. For example, a motor vehicle wheel bearing would have the constant applied load representing the weight of the vehicle acting on the bearing elements. Moreover, there are other bearing applications in which high radial-to-axial load ratios are present in which the radial load is stationary with respect to the bearing cone as opposed to the cup. In such instances, high stresses repeatedly acting on fixed areas of the cone can lead to premature bearing failure just as such loads acting on the bearing cup can produce such failures.

The fatigue life of a rolling element bearing and its ultimate load carrying capacity is directly related to the maximum stress developed between the rolling elements and the bearing races. Therefore, design modifications to a bearing which tend to reduce the peak loads as seen in FIGS. 1 and 2 tend to increase bearing life, even if they increase the angular extent of such loadings.

One aspect of this invention seeks to increase rolling element bearing life through a reduction in the peak stresses experienced where high applied load components are present. Such reductions in peak load are achieved through adjusting the flexibility of a bearing race in selected regions of the bearing. As flexibility of the bearing race increases, peak stresses can be reduced. The conventional tapered roller bearing element shown in FIG. 1 has a cup 12 and cone 14 which have a symmetrical configuration i.e. all radial cross sectional segments are substantially identical. In accordance with this invention, such symmetry is interrupted to produce circumferential segments of one (or both) of the bearing races which have a lower axial stiffness or greater flexibility.

Figure 3:
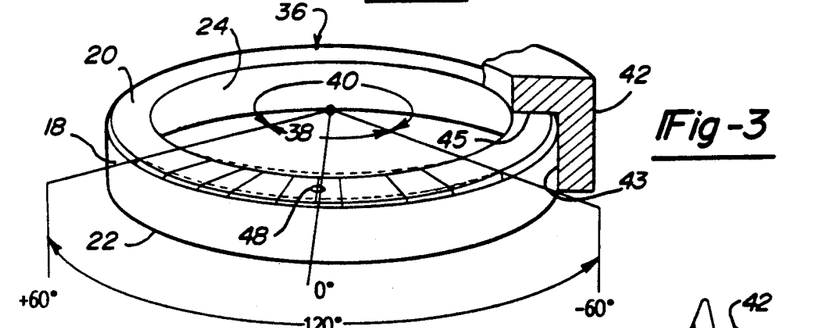
FIG. 3 is a pictorial view of a bearing cup of this invention having portions of the back face thereof relieved over a circumferential segment for providing greater axial compliancy of the cup in the area of the segment.

FIG. 3 shows a first embodiment of such a bearing arrangement. In the illustration of this embodiment, and those described later in this specification, element numbers first used in the description of bearing assembly 10 will be repeated to designate features common with those shown in FIG. 1. As shown in FIG. 3, bearing cup 36 includes a modified circumferential segment 38 of back face 20 which is relieved or cut away from the plane of the remaining unmodified segment 40 of the back face such that the modified segment has a decreased axial thickness. As shown in FIG. 3, modified segment 38 measures about 120° of the circumference of bearing cup 36. The phantom lines overlying segment 38 designate the plane of the unmodified segment 40. Modified segment 38 is cut below the surface of segment 40 and could define a plane parallel to the plane of segment 40. Therefore, the radial section area of the cup in modified segment 38 is less than that of unmodified segment 40. The amount of material removed within modified segment 38 is proportional to the degree of asymmetrical roller load at that position. The effect of material removal in modified segment 38 is related to the fact that back face 20 in that region forms the gap or region of less rigid coupling with surrounding structure between it and cup housing 42 shown in FIG. 3. Cup housing 42 has a cylindrical inside surface 43 and radial surface 45, both of which are dimensioned to support and closely receive bearing cup 12.

By providing a gap or region of less stiff coupling between cup 36 and one of the two cup housing surfaces 43 and 45, greater flexibility is provided since the cup is able to deform laterally due to less rigid support by the cup housing in that area. Roller element loads in modified segment 38 which become less rigidly supported by the cup housing 42 are decreased as cup 36 flexes away from the roller elements 16. The unmodified segment 40 remains rigidly supported and is forced to absorb some of the relieved loads in order to maintain equilibrium. With this modification, a decrease in the maximum magnitude of load results, along with a spreading of the circumferential segment which is subjected to loading, as designated by curve 47 of FIG. 2. Such a decrease in maximum load provides enhanced fatigue life for the bearing and a greater ultimate load capability.

Figure 4:
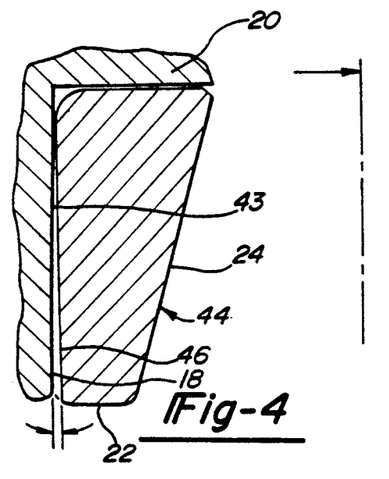
FIG. 4 is a radial cross-sectional view taken through a bearing cup of this invention showing an alternate approach toward providing circumferential segments of greater radial flexibility.

It should be noted that the various "gaps" shown in FIGS. 4 and many of the remaining Figures are, for some applications, exaggerated for the sake of clarity of illustration. In a particular application a discernable gap may not exist although the variation in flexibility of the race exists through modification of the race. In some instances, the "gap" indicated may be merely a local reduction in the degree of interference for press fit parts.

FIG. 4 represents an alternate embodiment of a modified bearing cup in accordance with this invention which is designated by reference number 44. Cup 44 is also modified along a circumferential segment of its perimeter, in this case through a reduction in it radial thickness. FIG. 4 is a radial cross-sectional view through cup 44. The outline of the unmodified portion of outside diameter 18 and defines a cylindrical surface with a central axis coaxial with that defining diameter 18. Modified outside diameter region 46 has a smaller diameter than that of the remainder of the outside diameter 18. Modified segment 46 forms a radial gap or region of less stiffness with respect to cup housing surface 43 and the modified region consequently has greater radial flexibility and thus produces a decrease in magnitude of loads as shown in curve 47 of FIG. 2.

It should be noted that asymmetrical variations in the flexibility of bearing elements (i.e. structural asymmetry) can be achieved either through modification of a bearing assembly component such as bearing cups 36 and 44 as described previously, or through appropriate modification to cup housing 42. If cup housing 42 is formed to have a non-circular inside surface 43 having regions of greater diameter (or a non-planar radial support surface 45) to produce a gap or area of decreased support along selected portions of the bearing cup, the same effect of increasing flexibility over a limited angular range can be achieved.

Due to the localized modifications to the bearing cups 36 and 44, it is necessary to properly orient or index such modified areas with respect to the applied load F. Various approaches toward indexing can be implemented. For example, an indexing mark 48 as shown in FIG. 3 can be utilized. Indexing mark 48 could be intended to be placed in opposition to a similar mark on cup housing 42 or oriented to a physical feature of cup housing 42. Moreover, positive indexing features such as slots, keyways, etc. could be employed to insure a particular angular indexed position.

Figure 5:
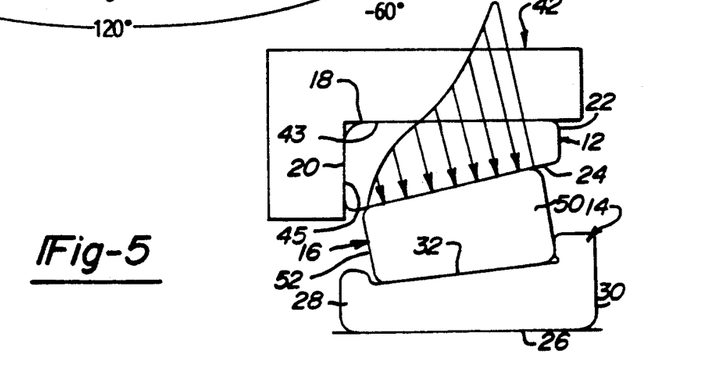
FIG. 5 is a radial cross-sectional view of a tapered roller bearing and showing the load distribution acting on a rolling element contact line in response to a loading misalignment.

In addition to the uneven circumferential load distribution imposed by radial forces, other loading conditions can impose high stress levels which limit bearing life. One cause of such peak loadings occurs as a result of misalignment between bearing cup 12 and cone 14. In misalignment conditions, the load distribution along the lines of contact of each roller element 16 with the raceways 12 and 14 can be quite nonuniform. FIG. 5 shows the load distribution across a tapered rolling element 16 contact line showing much higher normal forces at the element's large end 50 (i.e. larger diameter) as compared with small end 52.

Figure 6:
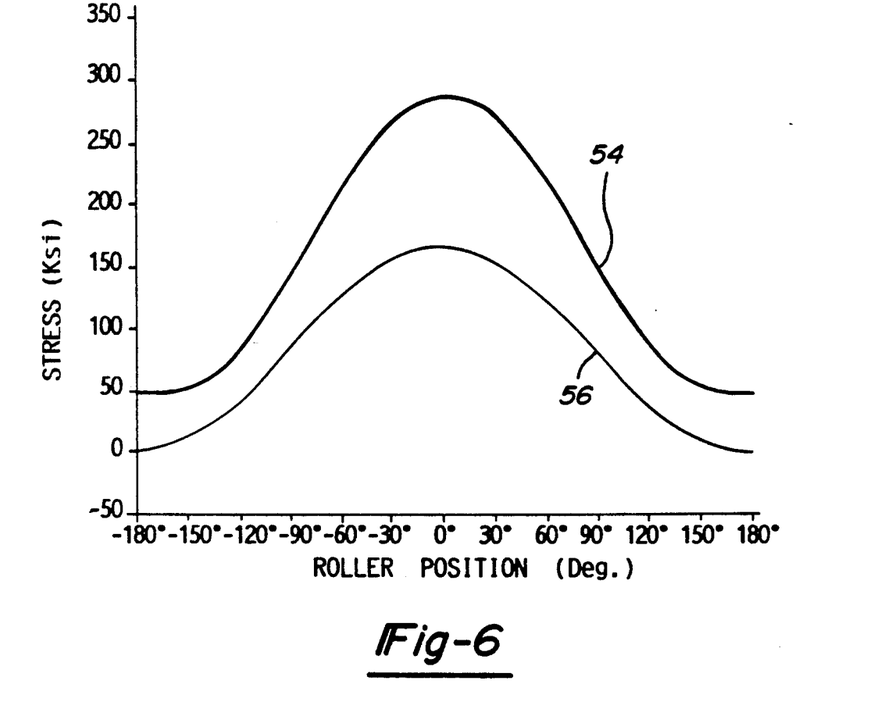
FIG. 6 is a graph showing compressive stress versus roller position for the large and small ends of the tapered bearing elements of the bearing shown in FIG. 5.

FIG. 6 provides a representative illustration of bearing element contact stresses for an application in which the bearing is subjected to a high level radial load component as well as misalignment. Curve 54 represents the contact stresses at large end 50, whereas curve 56 represents small end stresses. As in the case of the prior embodiments which address only circumferential load distribution, the existence of the peak loads as shown in curve 54 adversely affect bearing fatigue life and rated load carrying capacity. Moreover, unfavorable transient conditions can occur in which the higher load alternates between the ends of the rolling element. In accordance with this invention such bearing loads are decreased much in the manner of prior examples through introducing increased flexibility in the area of the higher normal load which tends to reduce those loads, making the large and small end normal loads more uniform.

Figure 7:
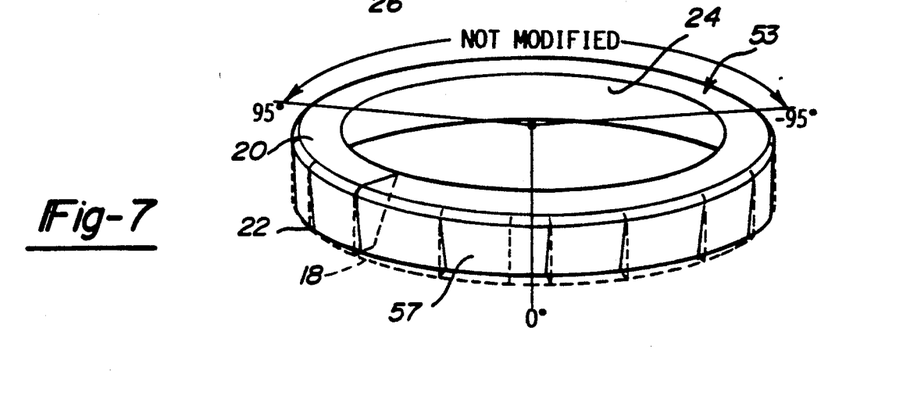
FIG. 7 is a pictorial view of a bearing cup in accordance with an embodiment of this invention modified to provide a more uniform distribution of loads across the bearing rolling element contact lines.
Figure 8:
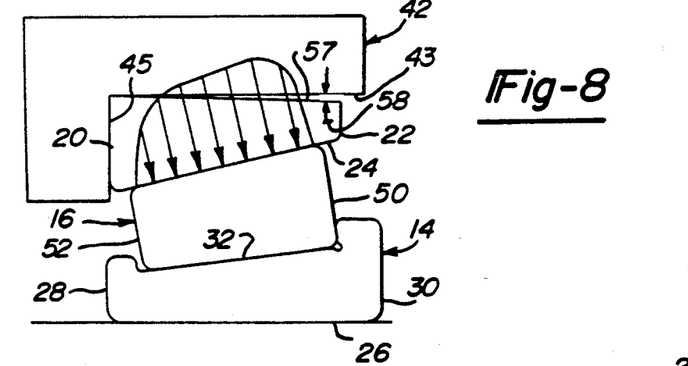
FIG. 8 is a pictorial view of a bearing according to this invention showing the contact line load distribution of a bearing modified in accordance with this invention.
Figure 9:
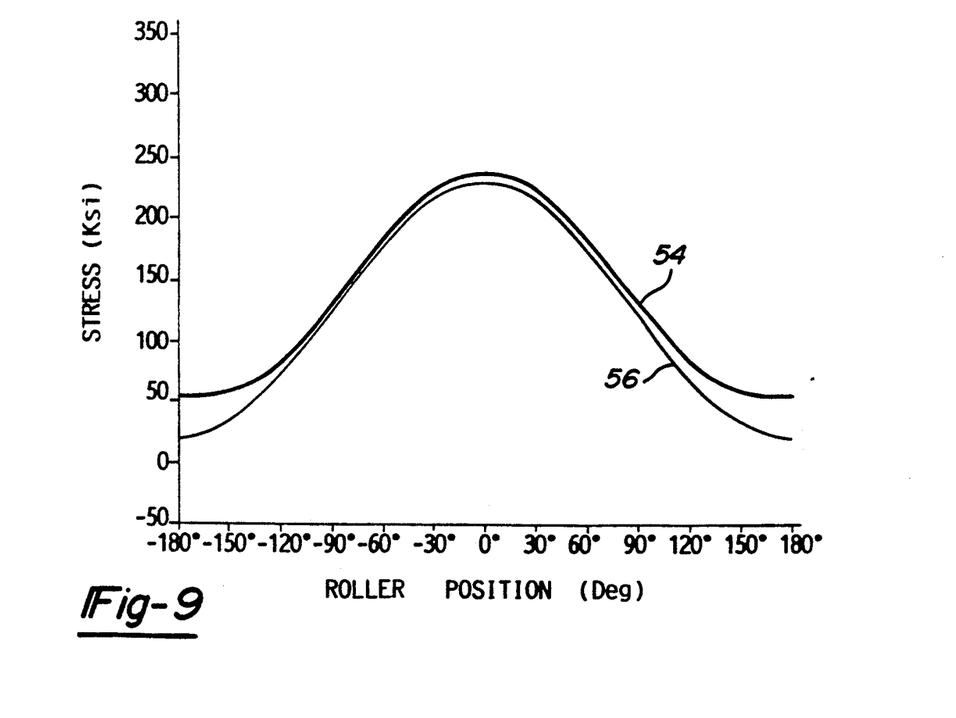
FIG. 9 is a graph showing stresses of the large and small end of a tapered roller bearing element at various circumferential positions showing the improvement in uniformity of load distribution of a bearing modified in accordance with this invention.

One embodiment for producing such a result is to remove portions of the bearing cup's outer diameter 18 which supports the high edge loading. In the case of the illustration of FIG. 5, large end 50 is more heavily loaded and, therefore, portions of the cup outer diameter 18 which radially oppose the element large end 50 are removed. As shown in FIG. 7, material is removed from outer diameter surface 18 of cup 53 in a smoothly tapered fashion starting at the original surface opposing small end 52, and tapering to produce a gap in the area opposing large end 50 thus defining a partial cylindrical surface skewed from the axial direction of the bearing assembly. Again, the amount of material removal would be proportional to the magnitude of the edge loading. A portion of outer diameter 18 must, however, remain at the original outer diameter to insure that the cup will seat properly within cup housing 42. Since the portion of the cup outer diameter 57 opposing large end 50 does not contact the cup housing surface 43 or is less rigidly supported by the housing, it more readily flexes in a radial direction. The result of this modification is shown in FIGS. 8 and 9. FIG. 8 shows the more uniform load distribution across the contact lines of roller element 16 and shows the radial gap 58 representing an area of lesser stiffness which exists in the area opposing element large end 5 at the interface between bearing cup 53 and housing 42. The effect of this modification is shown in FIG. 9 which shows that the loadings for the large and small end 54 and 56, respectively, become more equal to one another. As mentioned previously, a reduction in the higher peak loads shown in FIG. 6 enhances bearing longevity.

Figures 10, 13:
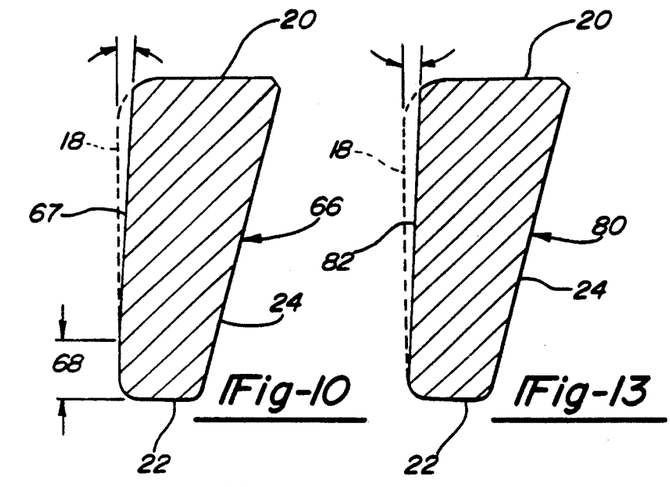
FIG. 10 is a radial cross-sectional view through a bearing cup modified in accordance with this invention to provide a reduction in small end stress.
FIG. 13 is a radial cross-sectional view through a bearing cup in accordance with this invention which provides a reduction in maximum stress resulting from applied loadings as well as bearing misalignment.

FIG. 10 shows a modified bearing cup 66 which has a conical outside surface 67 which is tapered in the opposite direction of that of bearing cup 53 shown in FIG. 7. This embodiment is intended to relieve a higher contact stress present at the small end 52 region of the bearing cup. Again, a region designated as 68 is present at the original bearing diameter 18 for seating of the cup.

Figure 11:
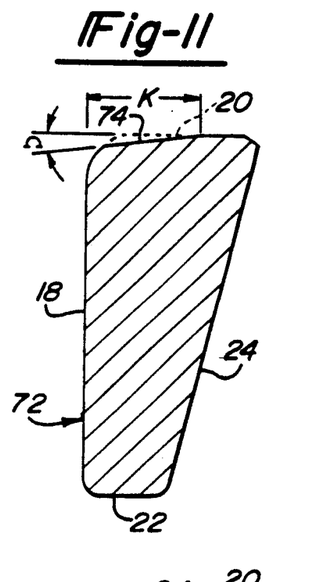
FIG. 11 is a radial cross-sectional view through a bearing cup in accordance with an embodiment of this invention in which the back face is modified to relieve large end stresses.

These inventors have found through experimentation that correction of non-uniform stress distributions along the contact lines of rolling elements 16 can also be influenced by providing controlled gaps or regions of lesser stiffness at the interface between bearing back face 20 and cup housing face surface 45. Cup 72 illustrated in FIG. 11 includes a back face 74 which has a surface which is conical and inclined to provide a gap which enlarges in the radially outer direction. This modification provides a gap or region of greater flexibility in the tapered region which has been found to alleviate large end 50 edge stresses. This stress reduction occurs since material in the area which is modified aids in supporting loads at large end 50. A portion of back face 20 of the bearing cup is preserved to provide axial location of cup 72 within the associated cup housing 42. In some applications, the modifications to adjust stresses along the line of contact between rolling bearing elements and races would need to be made 360° around the circumference of a race. For applications where modifications are not consistent around the perimeter of the bearing, indexing would be required.

Figure 12:
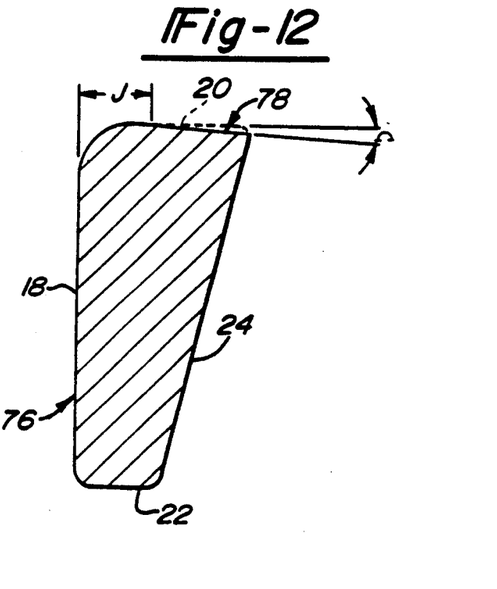
FIG. 12 is a radial cross-sectional view of a bearing cup in accordance with this invention featuring a back faced relieved to reduce small end stresses.

FIG. 12 illustrates cup 76 which also features a modified back face 78. In this case, however, the radial gap enlarges in the radially inner direction. This embodiment provides a reduction in stresses at small end 52.

For some embodiments of this invention in which the intent is to adjust loads in response only to misalignment, rotational indexing as in the case of cup 36 may be necessary. There are applications, however, in which it would be desirable to relieve radial loading induced stresses in addition to relieving nonuniform edge loading conditions. An embodiment for achieving such a combination of modifications is shown in FIG. 13. FIG. 13 is a cross-sectional view through a modified bearing cup 80. As is shown, the original outside diameter 18 is relieved to define a surface 82 which forms an angle with respect to original outside diameter 18. In this embodiment, however, none of the axial length of the outer diameter where the section is taken remains and, therefore, that region is less rigidly supported by the housing surface 43. Since it is necessary to provide a cylindrical surface of more than 180° around the bearing cup 80 which will seat within cup housing 42, the modification of FIG. 13 is not provided around the entire perimeter of the cup and rotational indexing would be appropriate. Due to the inclination of surface 82 to the original diameter 18, adjustment of the line contact load distribution on roller elements 16 is provided. Moreover, due to the fact that a radial gap or area of less rigid support exists between cup 80 and the cup housing 42 along the entire axial length of the cup outside surface 82 along a circumferential segment of the bearing cup, radial load stress distribution benefits are also provided.

Figure 14:
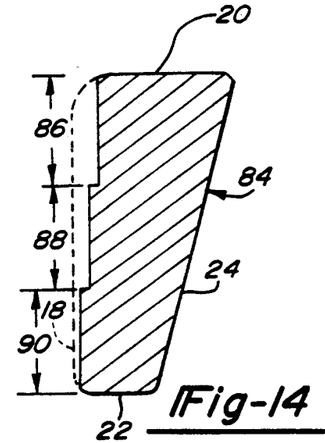
FIG. 14 is a radial cross-sectional view through a bearing cup according to an embodiment of this invention showing an approach toward controlling the compliancy of a bearing cup by providing step changes in radial thickness of the cup.

FIG. 14 shows modified cup 84 which acts in principle like that of cup 80 shown in FIG. 13 except that instead of providing a smooth outside surface, the outside surface is made of segments 86, 88 and 90 which are cylindrical surfaces of increasing diameters, all of which having a diameter smaller than the unmodified diameter of cup housing surface 43. Such an embodiment would operate in the same fashion as that of FIG. 13 but may provide machining benefits. As mentioned previously, however, it would be necessary to insure that an adequate portion of the outer perimeter of bearing cup 84 is seated within the associated bearing housing.

Figures 15, 18:
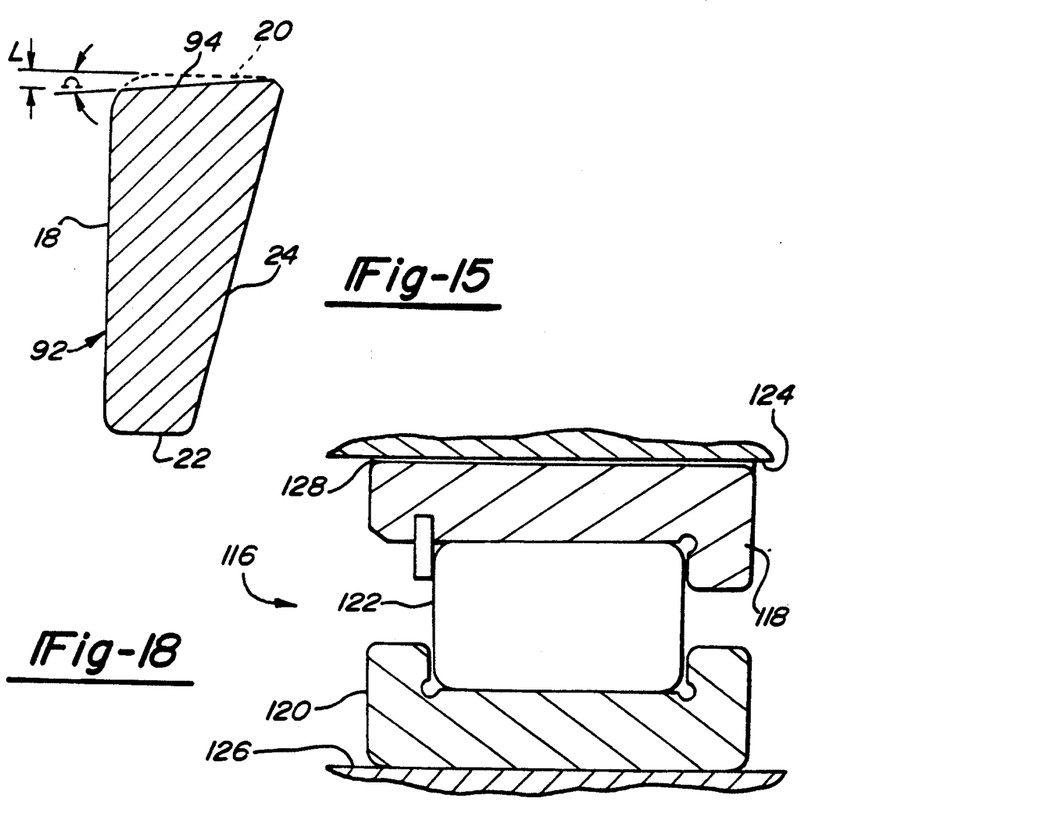
FIG. 15 is a radial cross-section of a cup in accordance with an embodiment of this invention featuring a modified back face surface which provides both a reduction in maximum stress in response to radial loading as well as a reduction in large end stresses.
FIG. 18 is a radial cross-sectional view of a bearing assembly according to this invention of the cylindrical bearing configuration showing alternative modifications for redistributing applied loads.

FIG. 15 illustrates bearing cup 92 which also provides a relief in maximum stress imposed by applied loads at selected circumferential segments and also provides for redistribution in the stresses between rolling element large and small ends 50 and 52. By a modification to all of back face 94 which provides an inclined surface, an axial gap or area of decreased rigidity is provided which aids in relieving stress associated with an applied load. The inclination of back face surface 94 provides for a relative adjustment in the stresses between the element large and small ends 50 and 52. Cup 92 shown would provide a larger reduction in stresses at large end 50.

Figure 16:
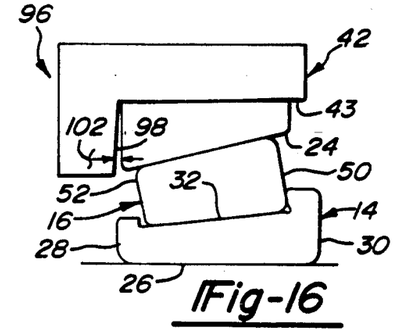
FIG. 16 is a radial cross-sectional view of a bearing assembly according to an embodiment of this invention shown being used with a bearing housing for modifying the load distribution on the bearing elements.
Figure 19:
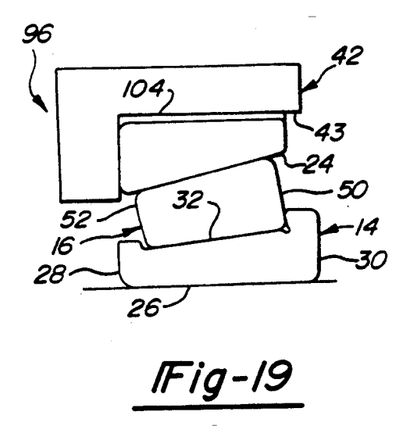
FIG. 19 is a radial cross-sectional view of an assembly similar to FIG. 16 illustrating a modification at the interface between the outer race and bearing cup.

FIG. 16 represents an embodiment of a bearing assembly 96 in which modifications to the flexibility of the bearing assembly are not provided through modification of cup 12 or cone 14, but rather in the structures which interacts with those components. In FIG. 16, the surface 98 of cup housing 42 which is normally in full contact with bearing cup back face 20 is relieved to define a wedged-shaped gap 102 or area of decreased support. The existence of gap 102 increases the flexibility of bearing cup 12 in the region opposing small end 52, having the same effect as the modification shown in FIG. 12. Similarly, as shown in FIG. 19 the inside surface 43 of cup housing 42 could be relieved along either of phantom line 104 to provide reductions in small and large end loadings, respectively, as is provided by the embodiments shown in FIGS. 7 and 10.

Figure 17:
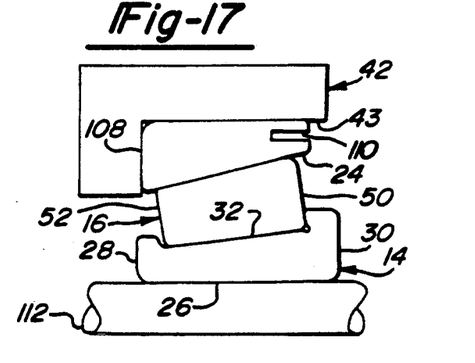
FIG. 17 is a radial cross-sectional view of another bearing assembly according to this invention showing an alternate approach toward modifying the compliancy comprising forming of a slot within the bearing outer race.

FIG. 17 illustrates still another embodiment to this invention in which increased flexibility is not provided by a modification of the interface between bearing cup 12 and housing 42, but rather in the compressibility of one of the bearing elements, in this case bearing cup 108. Cup 108 features a slot 110 formed within the cup front face 22 which increases the cup's radial compressibility in that area thus producing the same stress reductions provided by other embodiments of this invention. These concepts could be used not only for adjusting for large or small end loadings, but also could be used to modify load distribution in response to applied loading. For example, a portion of the circumference of bearing cup 12 could feature a series of holes drilled from back face 20 to front face 22, forming a segment of the cup's circumference with increased compressibility.

Figure 20:
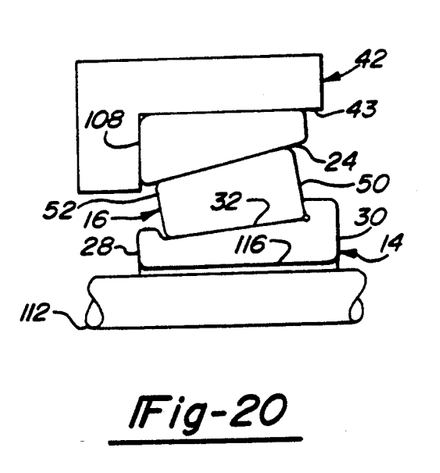
FIG. 20 is a radial cross-sectional view of another bearing assembly according to this invention similar to FIG. 17 but showing a modification at the interface between a bearing inner race and shaft.

FIG. 20 shows in addition the possible modifications to bearing cone 14 which could be made either to adjust for nonuniform contact line force distribution but also to provide a reduction in stresses caused by an applied load which rotates with bearing cone 14. In FIG. 20 a portion of the inside diameter of cone 14 can be cut away to line 116 to increase flexibility at localized circumferential segments. The concepts of bearing modification illustrated in FIG. 20 would also have applicability in environments where cone 14 is stationary while the cup rotates, or where the cup is stationary and a centrifugal load acts on rotating shaft 112 (and cone 14).

FIG. 18 shows a bearing assembly modified in accordance with this invention of the cylindrical roller bearing configuration. Bearing assembly 116 includes outer race 118, inner race 120, and cylindrical bearing elements 122. As shown, bearing element 116 is mounted within support structure including outer race housing 124 and shaft 126. As in the case of tapered bearing elements, cylindrical bearing assembly 116 may be subjected to non-uniformities both in applied loads and in the distribution of stress along the lines of contact between cylindrical element 122 and the associated races 118 and 120. The principles of this invention describe for application with tapered bearing elements are also applicable to bearings of the cylindrical configuration. For instances where there is a desire to balance the circumferential stress distribution a portion of outer race 118 can be relieved. By machining along line 128, a circumferential segment of outer race 118 becomes less rigidly supported thus providing the enhancement in stress distribution much as illustrated in FIG. 2 explained previously. As with the prior embodiments it would be necessary to insure adequate support of outer race 118 in outer race housing 124 with this modification. Adjustments in the stress distribution along the lines of contact between cylindrical element 122 and the associated races 118 and 120 can be provided by forming wedge shaped gaps or regions where a change in support occurs along the axial length of the bearing element. For the sake of illustration the gap provided by machining along line 128 is exaggerated. Depending upon the application, other modifications to the bearing shown in FIG. 18 could be applied to outer race housing 124, inner race 120 or shaft 126, as discussed with prior embodiments.

While the above description constitutes the preferred embodiments of the present invention, it will be appreciated that the invention is susceptible of modification, variation and change without departing from the proper scope and fair meaning of the accompanying claims.

We claim:

1. A rolling element bearing assembly comprising:
   an inner bearing race having an inner bore and a bearing element raceway;
   an outer bearing race having a bearing element raceway, an outer diameter surface and a pair of radial face surfaces;
   a bearing housing for supporting said outer bearing race and having surfaces which confront and engage said outer bearing race outer diameter surface and said pair of radial face surfaces thereby defining an interface between said bearing housing and said outer bearing race;
   a plurality of rolling bearing elements positioned between said inner and outer bearing race raceways;
   said rolling element bearing assembly having a first circumferential segment which is more flexible in response to an applied load than a second remaining circumferential segment wherein at least one of said outer bearing race or said bearing housing having a geometric asymmetry in said surfaces defining said interface resulting in said first circumferential segment; and
   indexing means for positioning said first circumferential segment with respect to said applied load such that contact forces between said rolling bearing elements in the area of said first circumferential segment are reduced as compared to a bearing assembly having substantially uniform flexibility characteristics.

2. A rolling element bearing assembly according to claim 1 wherein said first circumferential segment encompasses less than 180° of the circumference of said bearing assembly.

3. A rolling element bearing assembly according to claim 1 wherein said bearing housing defines a region of less rigid support of one of said pair of radial faces of said outer bearing race over said first circumferential segment.

4. A rolling element bearing assembly according to claim 3 wherein said bearing assembly is a tapered roller bearing wherein said outer race pair of radial face surfaces define a first and a second radial face surface with said second radial face surface being radially thicker than said first radial face surface and wherein said region of less rigid support is present adjacent said second radial face surface.

5. A rolling element bearing assembly according to claim 3 wherein one of said outer bearing race pair of radial face surfaces is rotationally asymmetrical in that said first circumferential segment of one of said outer bearing race pair of radial face surfaces has a smaller axial thickness than said second circumferential segment.

6. A rolling element bearing assembly according to claim 5 wherein one of said outer bearing race pair of radial face surfaces of said second segment defines a first planer surface and said one of said pair of radial face surfaces of said first circumferential segment being displaced from said first planer surface.

7. A rolling element bearing assembly according to claim 6 wherein one of said one of said pair of radial faces surfaces of said first circumferential segment defining a second planer surface displaced from said first planer surface.

8. A rolling element bearing assembly according to claim 7 wherein said second planer surface being normal to the axial direction of said bearing assembly.

9. A rolling element bearing assembly according to claim 7 wherein said second planer surface being skewed from the axial direction of said bearing assembly.

10. A rolling element bearing assembly according to claim 6 wherein one of outer bearing race pair of radial face surfaces and said first circumferential segment has a stepped surface.

11. A rolling element bearing assembly according to claim 3 wherein said bearing housing defines a generally radial surface having a first circumferential surface which is displaced from one of said outer bearing race radial face surfaces defining said region of less rigid support over said first circumferential segment and a second circumferential surface in abutting engagement with said one of said outer bearing race radial face surfaces defining said second circumferential segment.

12. A rolling element bearing assembly according to claim 1 wherein said interface between said outer bearing race outside diameter and said bearing housing defines a radial region of less rigid support to define said first circumferential segment.

13. A rolling element bearing assembly according to claim 12 wherein said outer bearing race outer diameter is rotationally asymmetrical.

14. A rolling element bearing assembly according to claim 13 wherein said outer bearing race outside diameter has a portion defining a cylindrical surface defining said second circumferential segment and said portion defining said region of less rigid support being displaced from said cylindrical surface and defining said first circumferential segment.

15. A rolling element bearing assembly according to claim 14 wherein said portion defining said region of less rigid support defining a second cylindrical surface having a diameter less than said first cylindrical surface.

16. A rolling element bearing assembly according to claim 15 wherein said second cylindrical surface being parallel to the axial direction of said bearing assembly.

17. A rolling element bearing assembly according to claim 15 wherein said portion defining said region of less rigid support having a cylindrical surface skewed from the axial direction of said bearing assembly.

18. A rolling element bearing assembly according to claim 14 wherein said portion defining said region of less rigid support having a stepped surface.

19. A bearing assembly according to claim 12 wherein said bearing housing defines a first cylindrical surface which closely receives said bearing outer race outer diameter surface and a second surface displaced radially outward of said first cylindrical surface to define said radial region of less rigid support.

20. A bearing assembly according to claim 1 wherein said bearing assembly is a cylindrical bearing wherein said rolling bearing elements are cylindrical elements.

21. A tapered roller bearing assembly comprising:
a bearing cone having an inner bore and a bearing element raceway;
a bearing cup having a bearing element raceway, an outer diameter surface, generally radial back and front faces, with said back face having a larger radial thickness than said front face;
a plurality of tapered rolling bearing elements positioned between said cup and cone raceways;
at least one of said cup or cone having a first circumferential segment which is more compliant than the remaining second circumferential segment; and
indexing means for positioning said first circumferential segment with respect to an applied load such that contact forces between said rolling bearing elements in the areas of said first circumferential segment are reduced as compared to a bearing assembly having substantially uniform compliancy characteristics.

22. A tapered roller bearing assembly according to claim 21 wherein said first circumferential segment encompasses less than 180° of the circumference of said bearing assembly.

23. A tapered roller bearing assembly according to claim 21 further wherein said bearing assembly is adapted to be supported by a bearing housing and one of said pair of outer bearing race radial faces defines a gap between one of said outer bearing race radial front or back faces and said bearing housing thereby defining a region of less rigid support over said first circumferential segment.

24. A tapered roller bearing assembly according to claim 23 wherein one of said cup radial faces is rotationally asymmetrical.

25. A tapered roller bearing assembly according to claim 24 wherein said cup back face surface has a portion defining a plane and said portion defining said region of less rigid support being displaced from said plane.

26. A tapered roller bearing assembly according to claim 25 wherein said portion defining said region of less rigid support having a planer surface.

27. A tapered roller bearing assembly according to claim 26 wherein said portion defining said region of less rigid support having a planer surface normal to the axial direction of said bearing.

28. A tapered roller bearing assembly according to claim 26 wherein said portion defining said region of less rigid support having a planer surface skewed from the axial direction of said bearing.

29. A tapered roller bearing assembly according to claim 25 wherein said portion defining said region of less rigid support having a stepped surface.

30. A tapered roller bearing assembly according to claim 21 wherein said bearing assembly is adapted to be supported by a bearing housing and said cup outside diameter and said bearing housing defines a region of less rigid support over a circumferential region to define said first circumferential segment.

31. A tapered roller bearing assembly according to claim 30 wherein said outer bearing race outer diameter is rotationally asymmetrical.

32. A tapered roller bearing assembly according to claim 31 wherein said cup outside diameter has a portion defining a cylindrical surface and said portion defining said region of less rigid support being displaced from said cylindrical surface.

33. A tapered roller bearing assembly according to claim 32 wherein said portion defining said region of less rigid support having a cylindrical surface.

34. A tapered roller bearing assembly according to claim 33 wherein said portion defining said region of less rigid support having a cylindrical surface parallel to the axis of said bearing assembly.

35. A tapered roller bearing assembly according to claim 34 wherein said portion defining said region of less rigid support having a cylindrical surface which is skewed from the axial direction of said bearing.

36. A tapered roller bearing assembly according to claim 32 wherein said portion defining said region of less rigid support having a stepped surface.

37. A tapered roller bearing assembly comprising:

a bearing cone having an inner bore and a bearing element raceway;

a bearing cup having an inner bearing element raceway, an outer diameter surface, and generally radial back and front faces, with said back face having a larger radial thickness than said front face;

a bearing housing for supporting said cup having a generally cylindrical surface for receiving said cup and a generally radial surface for engaging said cup back face, a plurality of tapered rolling bearing elements positioned between said cup and cone raceways; and wherein either the interface between said cup outer diameter surface and said housing cylindrical surface or the interface between said cup back face and said housing generally radial surface defining a region of less rigid support for the purpose of adjusting the uniformity of contact forces along the lines of contact between said bearing elements and said raceways.

38. A tapered roller bearing assembly according to claim 37 wherein said region of less rigid support is formed at the interface between said cup outer diameter and said housing generally cylindrical surface.

39. A tapered roller bearing assembly according to claim 38 whereby said region of less rigid support is defined by forming said bearing housing generally cylindrical surface with a cylindrical surface and said cup outside diameter surface being conical.

40. A tapered roller bearing assembly according to claim 38 wherein said region of less rigid support is formed by forming said cup outside diameter surface with a stepped outside surface of cylindrical segments of decreasing diameter.

41. A tapered roller bearing assembly according to claim 38 wherein said region of less rigid support is defined by said cup outside surface being cylindrical and said housing generally cylindrical surface being conical.

42. A tapered roller bearing assembly according to claim 37 wherein said region of less rigid support is formed between said cup back face and said housing generally radial surface.

43. A tapered roller bearing assembly according to claim 42 wherein said region of less rigid support is formed by said cup back face being planer and said housing generally radial surface being conical.

44. A tapered roller bearing assembly according to claim 42 wherein said region of less rigid support is formed by said cup back face being planer and said housing radial surface being planer.

45. A tapered roller bearing assembly according to claim 42 wherein said region of less rigid support is formed by said back face and said housing generally radial surface are parallel and displaced form one another.

46. A tapered roller bearing assembly comprising:

a bearing cone having an inner bore and a bearing element raceway;

a bearing cup having a bearing element raceway, an outer diameter surface, and generally radial back and front faces with said back face having a larger radial thickness than said front face, a bearing housing for supporting said outer bearing race;

a plurality of tapered rolling bearing elements positioned between said cup and cone raceways;

at least one of said cup or cone having a first circumferential segment which is more flexible than the remaining second circumferential segment;

indexing means for positioning said first circumferential segment with respect to an applied load such that contact forces between said rolling bearing elements in the region of said first circumferential segment are reduced as compared to a bearing assembly having substantially uniform flexibility characteristics; and wherein the interace between said cup outer diameter surface and said housing or the interface between said cup back face and said housing defining a region of less rigid support for the purpose of adjusting the uniformity of contact faces along the line of contact between said bearing elements and said raceways.

* * * * *

UNITED STATES PATENT AND TRADEMARK OFFICE
CERTIFICATE OF CORRECTION

PATENT NO. : 5,286,117
DATED : February 15, 1994
INVENTOR(S) : Scott A. Wojan, et al.

It is certified that error appears in the above-indentified patent and that said Letters Patent is hereby corrected as shown below:

In the Abstract, Line 6, after "elements" delete "features" and insert --feature--.

Column 10, Line 60, Claim 7 after 1st "said" delete "one of said". (our error)

Column 14, Line 14, Claim 45 after "displaced" delete "form" and insert --from--.

Column 14, Line 37, Claim 46 after "the" delete "interrace" and insert --interface--.

Signed and Sealed this

Fifth Day of July, 1994

Attest:

BRUCE LEHMAN

Attesting Officer     Commissioner of Patents and Trademarks